United States Patent
Wagner et al.

(10) Patent No.: US 7,234,567 B2
(45) Date of Patent: Jun. 26, 2007

(54) BRAKE TENSIONING DEVICE COMPRISING SHEARING FORCE MEASURING BOLT

(75) Inventors: Thomas Wagner, München (DE); Ulf Friesen, Neubiberg (DE); Josef Staltmeir, München (DE)

(73) Assignee: Knorr-Bremse Systeme für Schienenfahrzeuge GmbH, München (DE)

( * ) Notice: Subject to any disclaimer, the term of this patent is extended or adjusted under 35 U.S.C. 154(b) by 20 days.

(21) Appl. No.: 10/494,504

(22) PCT Filed: Sep. 23, 2003

(86) PCT No.: PCT/EP03/10553

§ 371 (c)(1), (2), (4) Date: Aug. 3, 2005

(87) PCT Pub. No.: WO2004/031607

PCT Pub. Date: Apr. 15, 2004

(65) Prior Publication Data

US 2006/0151261 A1    Jul. 13, 2006

(30) Foreign Application Priority Data

Sep. 27, 2002  (DE) .............................. 102 45 207

(51) Int. Cl.
F16D 66/00    (2006.01)

(52) U.S. Cl. ................................. 188/1.11 E
(58) Field of Classification Search ........... 188/1.11 R, 188/1.11 E
See application file for complete search history.

(56) References Cited

U.S. PATENT DOCUMENTS

| 4,607,729 | A |   | 8/1986  | Staltmeir et al. |
| 4,716,994 | A | * | 1/1988  | Iwamoto ................. 188/72.2 |
| 4,805,740 | A | * | 2/1989  | Wilke et al. ............. 188/173 |
| 5,279,394 | A | * | 1/1994  | Wollenweber et al. .. 188/1.11 E |
| 5,377,296 | A |   | 12/1994 | Greenway et al. |
| 5,648,644 | A |   | 7/1997  | Nagel |
| 5,961,190 | A |   | 10/1999 | Brandmeier et al. |
| 5,969,270 | A |   | 10/1999 | Doemes et al. |
| 5,971,110 | A | * | 10/1999 | Martin .................... 188/72.1 |
| 6,098,760 | A | * | 8/2000  | Seils ...................... 188/1.11 E |

(Continued)

FOREIGN PATENT DOCUMENTS

DE            35 43 456 A1     6/1987

(Continued)

OTHER PUBLICATIONS

Patent Abstracts of Japan, Ryuji et al., "Load Measuring Apparatus", Publication NO. 61145426. Pub. Date Jul. 3, 1986.

Primary Examiner—Devon Kramer
(74) Attorney, Agent, or Firm—Barnes & Thornburg LLP

(57) ABSTRACT

A brake application for a rail vehicle brake includes a brake actuator for application and release of the rail vehicle brake. Also included is a force converter for converting energy supplied by the brake actuator to a brake application movement. The force converter includes: (1) a shearing force measuring bolt arranged in a power transmission path; (2) at least one measuring sensor measuring breaking force either indirectly or directly; and (3) at least two mutually swivellable force transmission elements having passage openings. The shearing force measuring bolt forms a hinge bolt of a hinge, which hinge bolt penetrates the passage openings.

13 Claims, 1 Drawing Sheet

U.S. PATENT DOCUMENTS

| | | |
|---|---|---|
| 6,230,854 B1 | 5/2001 | Schwarz et al. |
| 6,345,225 B1 | 2/2002 | Bohm et al. |
| 6,397,981 B1 | 6/2002 | Tamasho et al. |
| 6,481,539 B1 * | 11/2002 | Shaw et al. ............. 188/1.11 L |
| 6,722,477 B1 | 4/2004 | Wolfsteiner et al. |
| 6,799,813 B2 | 10/2004 | Staltmeir |
| 6,802,211 B2 | 10/2004 | Schmidt |
| 6,805,224 B2 * | 10/2004 | Lauch et al. ............ 188/1.11 E |
| 6,840,354 B2 | 1/2005 | Grundwurmer et al. |
| 2001/0047684 A1 | 12/2001 | Schmidt |
| 2004/0074709 A1 | 4/2004 | Krug et al. |
| 2005/0006948 A1 | 1/2005 | Friesen |
| 2006/0151261 A1 * | 7/2006 | Wagner et al. ............ 188/72.9 |

FOREIGN PATENT DOCUMENTS

| | | |
|---|---|---|
| DE | 40 24 811 A1 | 2/1992 |
| DE | 196 07 759 C1 | 5/1997 |
| DE | 196 52 230 A1 | 6/1998 |
| DE | 198 28 700 A1 | 11/1999 |
| DE | 299 23 681 U1 | 2/2001 |
| EP | 0 283 947 A2 | 9/1988 |
| EP | 1 067 084 A1 | 2/2001 |

* cited by examiner

BRAKE TENSIONING DEVICE COMPRISING SHEARING FORCE MEASURING BOLT

BACKGROUND AND SUMMARY

The present disclosure relates to a brake application device for a rail vehicle brake.

From European Patent Document EP 0 283 947 A2, a brake application device for rail vehicle brakes is known. The brake application device includes a brake actuator for the application and/or release of the brake and a force converter for converting the energy supplied by the brake actuator into a brake application movement. The force converter includes a shearing force measuring bolt arranged in the flow of force and equipped with at least one measuring sensor for the indirect and direct braking force measuring. The shearing force measuring bolt forms a hinge bolt of a hinge projecting through passage openings of at least two force transmission elements of the force converter which can be swivelled with respect to one another. Therefore, a sliding movement takes place at the shearing force measuring bolt under considerable braking forces. As a result, wear gradually occurs at the shearing force measuring bolt which carries the measuring sensor and therefore requires high expenditures for its manufacturing and mounting. This wear leads to an expensive exchange.

The present disclosure relates to an electromechanical brake application device in which the shearing force measuring bolt has a longer service life.

According to the present disclosure, the brake application device includes a brake actuator for application and release of the rail vehicle brake. Also included is a force converter for converting energy supplied by the brake actuator to a brake application movement. The force converter includes: (1) a shearing force measuring bolt arranged in a power transmission path; (2) at least one measuring sensor measuring breaking force either indirectly or directly; and (3) at least two mutually swivellable force transmission elements having passage openings. The shearing force measuring bolt forms a hinge bolt of a hinge, which hinge bolt penetrates the passage openings. A bushing, having radially interior edge recesses, is arranged radially between at least one of the passage openings and the shearing force measuring bolt.

The greatest shearing stress of the shearing force measuring bolt occurs in the area of the abutting planes of the force transmission elements. Axial edge areas of the bushings are subject to bending stress. Because of the radially interior edge recesses, the axial edge areas of the bushings are more flexible than the areas adjoining them, whereby high edge pressures are avoided between the bushings and the shearing force measuring bolt. The resulting evening-out of the tensions has a positive effect on the contact pattern of the sliding pairing which includes the bushing and the shearing force measuring bolt. Also, because of lower edge pressure, the stressing of the shearing force measuring bolt, whose manufacturing and mounting is relatively expensive, is reduced, and its service life is thereby increased.

According to an embodiment of the present disclosure, the bushing is non-rotatably held in the passage opening, in which case the bushing forms a sliding pairing with the shearing force measuring bolt. The bushing is constructed such that, with respect to wear conditions, such as hardness, surface roughness, material, etc., the bushing forms the sliding partner which tends to wear out earlier. The material of the bushing can be selected to be relatively soft for this purpose, and the shearing force measuring bolt can be selected to be correspondingly hard. As a result, gradually occurring wear takes place in the less expensive and easily exchangeable bushing instead of at the much more expensive shearing force measuring bolt.

According to the present disclosure, a carrying area of a radially exterior circumferential surface of the shearing force measuring bolt is formed by a cylindrically smooth surface without recesses or steps. Because of a lack of notches, this has a favorable effect on the endurance of the shearing force measuring bolt acting as a hinge bolt. As a result, the manufacturing of the shearing force measuring bolt is also easier and less expensive.

The shearing force measuring bolt may have an end-side bolt head with an enlarged diameter, in which bolt head an electronic sensor signal analyzing unit is accommodated. The shearing force measuring bolt therefore forms a complete measuring module which can supply signals to a braking force control. As a result, the shearing force measuring bolt can be integrated, as a separate measuring module into a control circuit of brake application devices. Such an arrangement may considerably simplify mounting, exchange or retrofitting. The shearing force measuring bolt may have only one standardized interface which can be connected to a braking force control device by persons not skilled in the field.

A measuring sensor, a connection wiring for the electronic sensor signal analyzing unit as well as the electronic sensor signal analyzing unit itself may each be provided redundantly. Thus, an increased reliability of the measuring arrangement may be achieved. In addition, a plausibility check can be carried out by comparing the measuring signals of two or more measuring circuits.

Other aspects of the present disclosure will become apparent from the following descriptions when considered in conjunction with the accompanying drawings.

DETAILED DESCRIPTION

Figure 1:
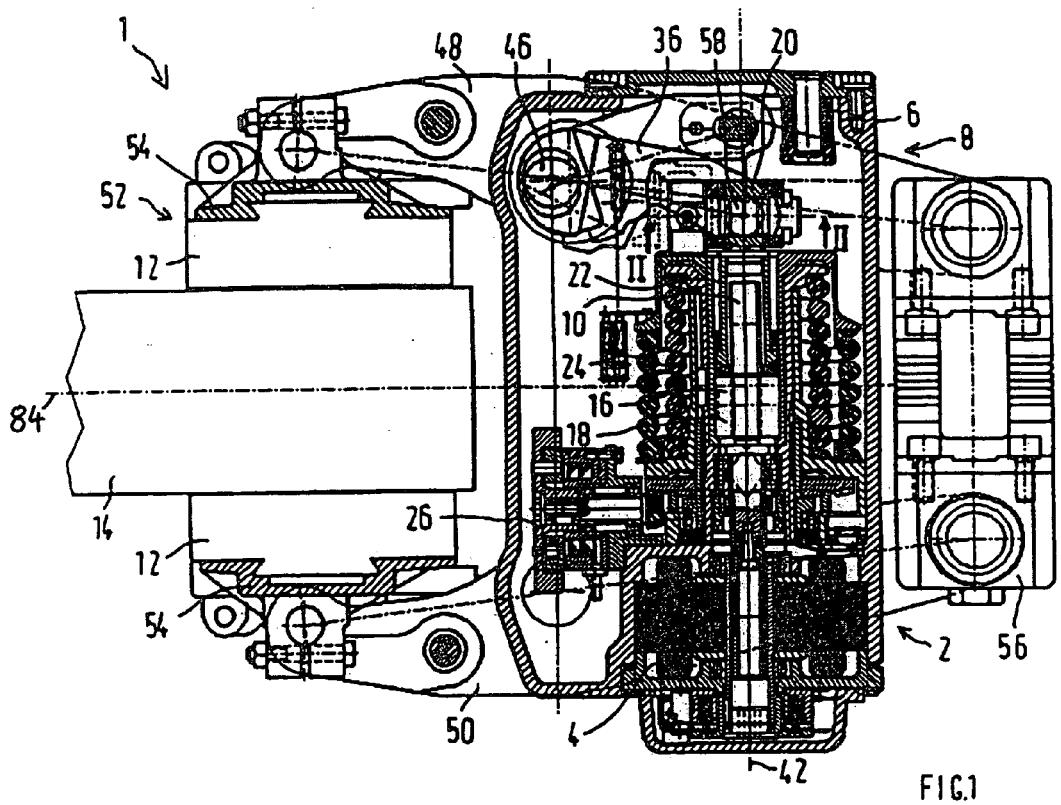
FIG. 1 is a sectional view of an embodiment of a brake application device having an integrated shearing force measuring bolt, according to the present disclosure.

A brake application device, for a rail vehicle is shown in FIG. 1. The device 1 may be electromechanical. The device 1 includes a brake actuator 2 having a service brake unit (not separately identified) and an accumulator-type brake unit (not separately identified). The service brake unit includes an electric drive, shown for example, as an electric servomotor 4, which is accommodated in an actuator housing 6 of the brake actuator 2. A mechanical force converter 8 is used for converting energy supplied by the brake actuator 2 to a brake application movement.

The servomotor 4 causes a coaxial brake spindle 10 to carry out rotations which are converted by the force converter 8 to a brake application movement of brake pads 12 in a direction of a brake disc 14. Among other things, the force converter 8 comprises a spindle/nut constructional unit 16 with a spindle nut 18 which is rotatably disposed on the brake spindle 10 and which, when the brake spindle 10 is rotated, can carry out linear movements in a direction of a spindle axis 42. An end of the brake spindle 10 facing away from the servomotor 4 projects into a cylindrical hollow section of a transmission element or connecting rod 20, which rod 20 is connected in an axially fixed manner with the spindle nut 18. In addition, the cylindrical hollow section of the connecting rod 20 is held in an axially fixed manner in a sliding sleeve 22 against which at least one pre-loaded spring 24, which is supported on the actuator housing 6, is prestressed in a brake release position. The pre-loaded spring 24 is part of the accumulator-type brake unit and is used as an energy accumulator for storing and supplying energy for the application of the brake as a service-type emergency brake. That service-type emergency brake is used in the sense of an underlying safety level in the event of a failure of the service brake unit and/or as a parking brake. The service brake unit as well as the accumulator-type brake unit act upon the connecting rod 20. The pre-loaded spring 24 is held in the prestressed position by a locking device 26.

Figure 2:
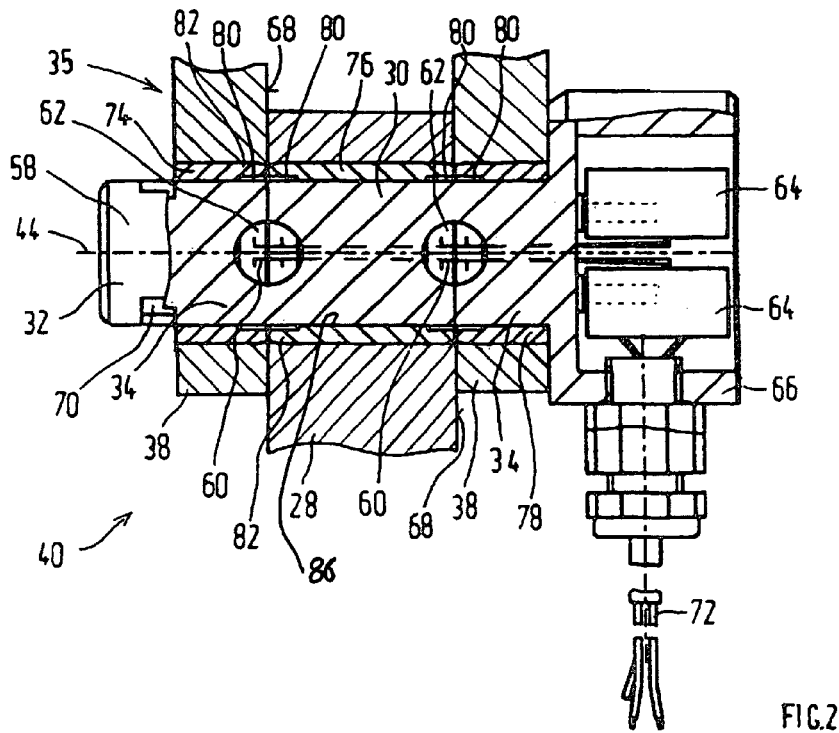
FIG. 2 is a sectional view of the shearing force measuring bolt of FIG. 1 taken along Line II—II.

A plate-shaped small end 28 of the connecting rod 20 projects out of the sliding sleeve 22 and is provided with a passage opening or connecting rod eye 30. As illustrated in FIG. 2, a hinge bolt 32 penetrates the connecting rod eye 30 as well as passage openings or bores 34 coaxial thereto of cheeks 38. Cheeks 38 axially reach around the connecting rod eye 30 and are constructed on an end-side fork 35 of a brake lever 36. The cheeks 38 of the brake lever 36, the small end 28 of the connecting rod 20 and the hinge bolt 32 together form a hinge 40 of the force converter 8, whereby one end of the brake lever 36 is linked to the connecting rod 20 perpendicular to the spindle axis 42. When the brake spindle 10 is driven in the brake application direction or when the locking device 26 of the pre-loaded spring 24 is released, and because of a then axially moving-out connecting rod 20, the hinge bolt 32, among other things, is stressed by shearing forces acting upon bolt axis 44 essentially perpendicularly at the same time, the brake lever 36 rotates with respect to the connecting rod 20.

The other end of the brake lever 36 acts upon an eccentric arrangement with an eccentric shaft 46 which is linked to a caliper lever 48 and, together with another caliper lever 50, forms a caliper 52. Brake pad holders 54 with brake pads 12 are arranged at one set of ends of the caliper levers 48, 50 and are displaceable in a direction of the axis 84 of the brake disc 14. Ends of the caliper levers 48, 50 facing away from the brake pads 12 are connected with one another by a pressure rod actuator 56 which may be electrically operated. The just-described arrangement also forms a part of the force converter 8 which converts move-out motions of the connecting rod 20 caused by the servo motor 4 or by the pre-loaded spring 14 to a brake application movement of the brake pads 12 in the direction of the brake disc 14.

As illustrated in FIG. 2, the hinge bolt 32 of the hinge 40 is formed by a shearing force measuring bolt 58. The shearing force measuring bolt 58 is provided with at least one measuring sensor 60 for the measuring of levels or amount of braking force acting upon the brake pads 12, which can be derived either indirectly or directly. In an embodiment of the present disclosure, the at least one measuring sensor 60 is formed as load cells of a thin-film method, which are accommodated, for example, in transverse or cross bores 62 extending perpendicular to the bolt axis 44 and may be laser-welded there. The cross bores 62 are situated in an area of radial abutting planes 68 of the small end 28 of the connecting rod 20. The cross bores 62 extend perpendicular to the bolt axis 44, with the cheeks 38 of the fork 35 of the brake lever 36. The cross bores 62 extend in an area of shearing planes of the shearing force measuring bolt 58 stressed by shear by forces in an opposite direction when the brake actuator 2 is operated. Because of elastic shear deformations of the shearing force measuring bolt 58 caused by the shearing forces acting in the opposite directions, the load cells 60 generate proportional signals and supply them to an electronic sensor signal analyzing unit 64.

As an alternative, instead of the load cells 60, any other type of measuring sensor can be used by which the elastic deformations of the shearing force measuring bolt 58 can be measured. Such measuring sensors can be, for example, pressure-measuring transducers which operate according to a capacitive, piezoelectric or piezoresistive principle.

The shearing force measuring bolt 58 has an end-side bolt head 66 whose diameter is enlarged and in which the electronic sensor signal analyzing unit 64 is accommodated. The unit 64 may be cast into the bolt head 66, whereby a vibration-absorbing or vibration-uncoupling accommodation is obtained. When strain gauges are used as a measuring element 60, the electronic analyzing unit 64 includes, for example, a strain gauge bridge amplifier circuit. The strain gauges form, for example, a complete or at least half a measuring bridge. A signal of this measuring bridge is amplified and processed by the electronic analyzing unit 64. The strain gauges maybe held in an axial bore of the shearing force measuring bolt 58.

In a mounted condition, an upper cheek 38 of the brake lever 36 axially impacts on a face-side ring surface of the bolt head 66. An end of the shearing force measuring bolt 58 pointing away from the bolt head 66 has an outer groove 70 extending transversely to the bolt axis 44. Outer groove 70 is configured to receive a position-securing snap ring, so that the cheeks 38 of the fork 35 of the brake lever 36 can rest with play on the small end 28 of the connecting rod 20 and relative movements can occur in the abutting planes 68. In a carrying area 86, that is, in an area accommodating the cheeks 38 and the connecting rod eye 30, a radially exterior circumferential surface of the shearing force measuring bolt 58 forms a cylindrically smooth surface without recesses or steps.

In the electronic sensor signal analyzing unit 64, a conversion of shear deformation signals takes place to signals for the actual braking force. The braking force acts upon the brake pads 12, and the signals are transmitted to a control and regulating device (not shown), in order to be able to adjust a desired braking force by a desired versus actual comparison. Furthermore, the received signals for the actual braking forces are used for monitoring of a force adjustment and operability of the brake application device 1 during safety-relevant brakings. In addition, for a verification of the measuring results, the motor current measured on a drive side by a current sensor can be matched with the signal for the actual braking force. The measuring sensors 60, a connection wiring 72 for the electronic sensor signal analyzing unit 64 as well as the electronic sensor signal analyzing unit 64 itself are each provided in a redundant construction. Furthermore, the redundantly provided connection wires 72 are each equipped with their own shield.

One cylindrical bushing 74, 76, 78, respectively, is non-rotatably held in the connecting rod eye 30 of the small end 28 of the connecting rod 20 and in the passage bores 34 of the cheeks 38 of the fork 35 of the brake lever 36. The bushings 74, 76, 78 are held, for example, by a pressing-in. Each of the bushings 74, 76, 78 forms a sliding pairing with the shearing force measuring bolt 58, with the relative movement taking place at the radially interior circumferential surfaces of the bushing 74, 76, 78. The bushings 74, 76, 78 are constructed such that with respect to wear conditions, such as hardness, surface roughness, material, etc., they form the sliding partner which tends to wear out earlier in comparison to the shearing force measuring bolt 58. The bushings 74, 76, 78 may be made of a sintered material, for example, a sintered bronze, and the shearing force measuring bolt 58 may be made of a hardened steel. Such sintered metals can absorb up to 35% of their volume of oil and can lubricate their sliding surface themselves as a result of capillary action.

As illustrated in FIG. 2, the bushings 74, 76, 78 essentially have the same length as the passage bores 34 carrying them or as the connecting rod eye 30. The bushings 74, 76, 78 include radially interior edge recesses 80 which have, for example, a surroundingly ring-shaped construction and essentially a rectangular cross-section. As an alternative, the edge recesses 80 may have any other shapes. The radially interior edge recesses 80 face one another and are arranged in the area of the two lateral abutting planes 68 of the cheeks 38 with the small end 28 of the connecting rod 20. The radially interior edge recesses are thus in the planes in which the cross-bores 62 having the measuring sensors 60 are also situated. The greatest shearing stress of the shearing force measuring bolt 58 may exist in the area of the abutting planes 68, in which case, axial edge areas 82 of the bushings 74, 76, 78 are subject to bending stress. Because of the radially interior edge recesses 80, the edge areas 82 of the bushings 74, 76, 78 are more flexible than adjoining areas, whereby high edge pressures are avoided. A resulting evening-out of tensions has a positive effect on a contact pattern of the sliding pairings that include bushings 74, 76, 78 and the shearing force measuring bolts.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A brake application for a rail vehicle brake, comprising:
   a brake actuator for application and release of the rail vehicle brake;
   a force converter for converting energy supplied by the brake actuator to a brake application movement, the force converter including
      a shearing force measuring bolt arranged in a power transmission path,
      at least one measuring sensor measuring braking force one of indirectly and directly,
      at least two mutually swivellable force transmission elements having passage openings, and
      wherein the shearing force measuring bolt forms a hinge bolt of a hinge, which hinge bolt penetrates the passage openings, and
   a bushing having radially interior edge recesses is arranged radially between at least one of the passage openings and the shearing force measuring bolt.

2. The brake application device according to claim 1, wherein the bushing is non-rotatably held in the passage openings.

3. The brake application device according to claim 2, wherein the bushing forms a sliding pairing with the shearing force measuring bolt the bushing being constructed such that, with respect to wear conditions, the bushing wears out before the shearing force measuring bolt.

4. The brake application device according to claim 1, wherein the bushing is assigned to at least one of the passage openings.

5. The brake application device according to claim 4, wherein each of the assigned bushings has essentially the same axial length as the respectively assigned passage opening and radially interior edge recesses are arranged in an area of abutting planes of the at least two force transmission elements.

6. The brake application device according to claim 5, wherein measuring sensors are held in one of the following:
   a) transverse bores of the shearing force measuring bolt and
   b) axial bores of the shearing force measuring bolt.

7. The brake application device according to claim 6, wherein the transverse bores are arranged in the area of the abutting planes.

8. The brake application device according to claim 1, further including two force transmission elements, and one of the force transmission elements comprises an eye forming one of the passage openings, and the other force transmission element comprises a fork having cheeks axially reaching around the eye, and each of the two force transmission elements has a passage opening.

9. The brake application device according to claim 8, wherein one of the force transmission elements is a connecting rod operated by the brake actuator, and the other force transmission element is a brake lever of a caliper.

10. The brake application device according to claim 1, wherein a carrying area of a radially exterior circumferential surface of the shearing force measuring bolt is formed by a cylindrically smooth surface.

11. The brake application device according to claim 1, wherein the at least one measuring sensor includes one or more of the following: a) strain gauges, b) load cells of a thin-film method c) pressure-measuring elements.

12. The brake application device according to claim 1, wherein the shearing force measuring bolt includes an end-side bolt head having an enlarged diameter in which an electronic sensor signal analyzing unit is accommodated.

13. The brake application device according to claim 1, further including two measuring sensors and two electronic sensor signal analyzing units and connection wiring for each electronic sensor signal analyzing unit.

* * * * *